United States Patent
Gish

(10) Patent No.: US 9,942,449 B2
(45) Date of Patent: Apr. 10, 2018

(54) GAMUT MAPPING SYSTEMS AND METHODS

(71) Applicant: Dolby Laboratories Licensing Corporation, San Francisco, CA (US)

(72) Inventor: Walter Gish, Oak Park, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 139 days.

(21) Appl. No.: 14/913,278

(22) PCT Filed: Aug. 20, 2014

(86) PCT No.: PCT/US2014/051940
§ 371 (c)(1),
(2) Date: Feb. 19, 2016

(87) PCT Pub. No.: WO2015/026976
PCT Pub. Date: Feb. 26, 2015

(65) Prior Publication Data
US 2016/0212304 A1 Jul. 21, 2016

Related U.S. Application Data

(60) Provisional application No. 61/869,027, filed on Aug. 22, 2013.

(51) Int. Cl.
*H04N 1/60* (2006.01)
*H04N 9/64* (2006.01)
(Continued)

(52) U.S. Cl.
CPC ............. *H04N 1/6058* (2013.01); *G09G 5/02* (2013.01); *H04N 9/12* (2013.01); *H04N 9/3182* (2013.01);
(Continued)

(58) Field of Classification Search
None
See application file for complete search history.

(56) References Cited

U.S. PATENT DOCUMENTS 6,104,446 A 8/2000 Blankenbecler
6,414,690 B1 7/2002 Balasubramanian
(Continued)

FOREIGN PATENT DOCUMENTS

JP H05-191641 7/1993
JP 2008-271001 11/2008
(Continued)

OTHER PUBLICATIONS

Bakke, A. et al. "Multispectral Gamut Mapping and Visualization: A First Attempt" Proc. SPIE 5667, The International Society for Optical Engineering, Color Imaging X: Processing, Hardcopy, and Applications, Jan. 17, 2005, pp. 193-200.
(Continued)

*Primary Examiner* — Michael J Cobb

(57) ABSTRACT

Novel methods and systems for image processing and gamut mapping are disclosed, where image parameters in a first color space are transformed into parameters in a second color space. In one example, the gamut mapping system processes the image parameters in a parametrized space using substantially rectangular spectral functions. In another example, the gamut mapping system processes the image parameters in a parametrized space using smooth spectral functions. The smooth spectral functions may include a linear combination of functions, including at least a cosine square function. Image parameters may include an intensity parameter, a center wavelength parameter, and a saturation parameter.

35 Claims, 13 Drawing Sheets

(51) Int. Cl.
*H04N 9/31* (2006.01)
*G09G 5/02* (2006.01)
*H04N 9/12* (2006.01)

(52) U.S. Cl.
CPC ......... *H04N 9/646* (2013.01); *G09G 2340/06* (2013.01)

(56) References Cited

U.S. PATENT DOCUMENTS

| | | |
|---|---|---|
| 6,873,439 B2 | 3/2005 | Levy |
| 6,894,806 B1 | 5/2005 | Woolfe |
| 6,954,287 B1 | 10/2005 | Balasubramanian |
| 7,710,369 B2 | 5/2010 | Dowling |
| 7,893,945 B2 | 2/2011 | Ramanath |
| 7,916,341 B2 | 3/2011 | Tin |
| 8,019,154 B2 | 9/2011 | Tin |
| 8,068,255 B2 | 11/2011 | Stokes |
| 8,139,213 B2 | 3/2012 | Bahatt |
| 8,154,559 B2 | 4/2012 | Stauder |
| 8,929,654 B2 | 1/2015 | Gish |
| 8,947,549 B2 | 2/2015 | Gish |
| 2007/0035751 A1 | 2/2007 | Presley |
| 2007/0053023 A1* | 3/2007 | Suzuki ................. H04N 1/6058 358/518 |
| 2008/0178948 A1 | 7/2008 | Wilmshurst et al. |
| 2008/0204366 A1 | 8/2008 | Kane |
| 2009/0009539 A1 | 1/2009 | Ahn |
| 2009/0085926 A1* | 4/2009 | Kim ..................... G09G 3/2003 345/604 |
| 2010/0245381 A1 | 9/2010 | Samadani |
| 2011/0273495 A1 | 11/2011 | Ward |
| 2014/0348426 A1* | 11/2014 | Gish ........................ H04N 1/60 382/167 |
| 2017/0163851 A1* | 6/2017 | Yamada ............... H04N 1/6066 |

FOREIGN PATENT DOCUMENTS

| | | |
|---|---|---|
| WO | 2011/141853 | 11/2011 |
| WO | 2011/143117 | 11/2011 |
| WO | 2013/101639 | 7/2013 |
| WO | 2013/101642 | 7/2013 |

OTHER PUBLICATIONS

Katoh, N. et al "Three-Dimensional Gamut Mapping Using Various Color Difference Formulae and Color Spaces" Journal of Electronic Imaging, SPIE, vol. 8, No. 4, Oct. 1, 1999, pp. 365-378.

* cited by examiner

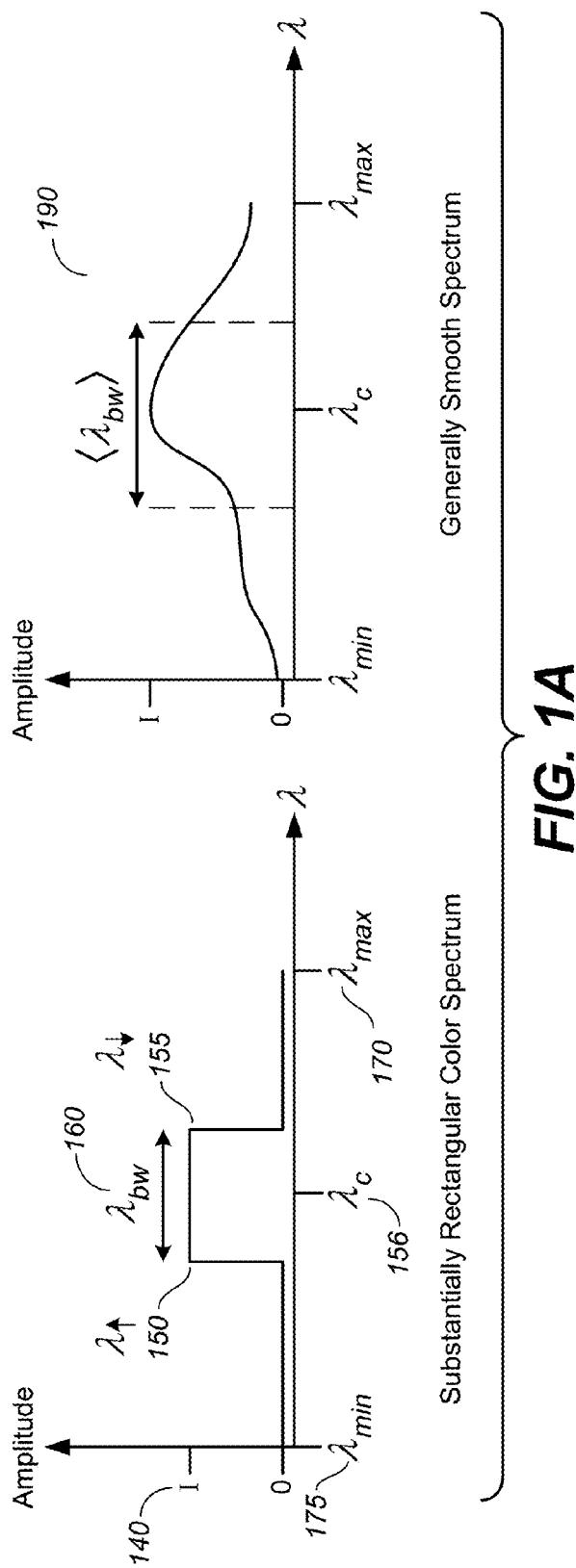

GAMUT MAPPING SYSTEMS AND METHODS

CROSS REFERENCE TO RELATED APPLICATIONS

This application claims priority to U.S. Provisional Application No. 61/869,027, filed on 22 Aug. 2013, which is incorporated herein by reference in its entirety.

The present application may be related to International Patent Application No. PCT/US2012/070837" filed on Dec. 20, 2012, and International Patent Application No. PCT/US2012/070855 filed on Dec. 20, 2012, the disclosures of both are incorporated herein by reference in their entireties.

TECHNICAL FIELD

The present disclosure relates to image processing, such as mapping. More particularly, it relates to gamut mapping systems and methods.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 1A depicts exemplary rectangular and smooth spectra.

SUMMARY

Figure 1B:
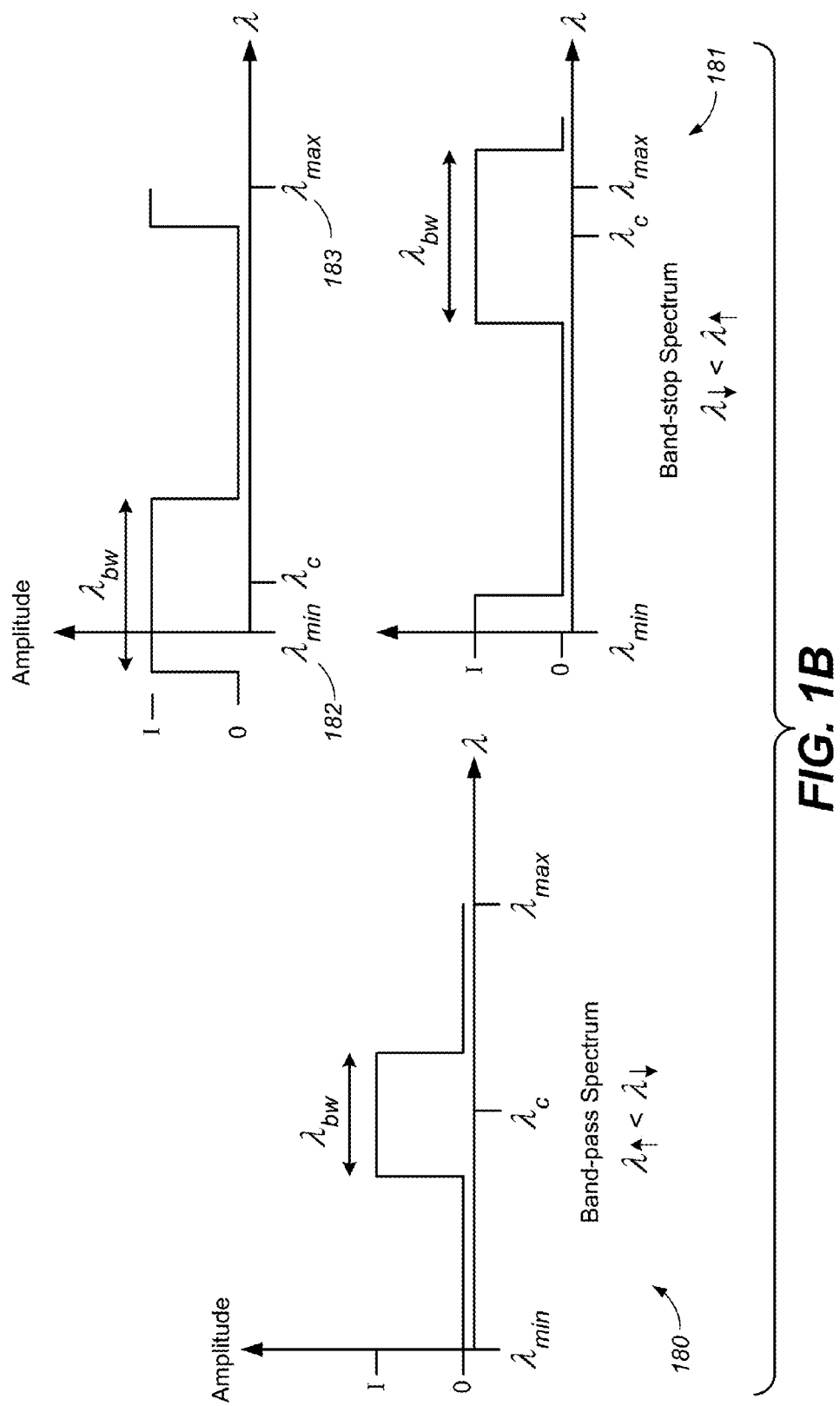
FIG. 1B depicts exemplary band-pass and band-stop spectra.

In a first aspect of the disclosure, a method is described, the method comprising: characterizing a target image for display on a display device, the characterizing comprising defining a boundary of the target image in terms of a parameterized set of coordinates, the parameterized set of coordinates based at least in part, on an intensity parameter, a center wavelength parameter, and a saturation parameter; generating a gamut representation for at least one pixel of the characterized target image, the gamut representation comprising a first gamut ratio directed at the saturation parameter of the at least one pixel, and a second gamut ratio directed at the intensity parameter of the at least one pixel; using a threshold value to determine from at least one of the first or the second gamut ratios whether the at least one pixel is out of gamut; and if out of gamut, modifying at least one of the first or the second gamut ratios to obtain a desired value with respect to the threshold value.

In a second aspect of the disclosure, a system is described, the system comprising: a converter module configured to receive a first set of parameters associated with a first image defined in a first color space, and to translate the first set of parameters into a parameterized set of coordinates, the parameterized set of coordinates based at least in part, on an intensity parameter, a center wavelength parameter, and a saturation parameter; a gamut computing module configured to generate from the parameterized set of coordinates, a gamut representation comprising a first gamut ratio directed at the saturation parameter of a at least one pixel, and a second gamut ratio directed at the intensity parameter of the at least one pixel; and a gamut conversion module configured to generate a second image defined in a second color space, the generating comprising using a threshold value to determine from at least one of the first or the second gamut ratios whether the at least one pixel is out of gamut, and if out of gamut, modifying at least one of the first or the second gamut ratios to obtain a desired value with respect to the threshold value.

In a third aspect of the disclosure, a method is described, the method comprising: characterizing a target image for display on a display device, the characterizing comprising defining a smooth spectra mathematical model in three dimensions, wherein the three dimensions are an intensity parameter, a wavelength parameter, and a saturation parameter; generating a gamut representation for at least one pixel of the characterized target image, based on the smooth spectra mathematical model; optimizing at least one of the intensity parameter, wavelength parameter and saturation parameter for the at least one pixel; converting the target image to tristimulus color space.

DESCRIPTION OF EXAMPLE EMBODIMENTS

As used herein, the phrase "gamut mapping" may relate to processing methods that may be performed or computed to achieve accurate color conversion between different gamuts, e.g., RGB output from a specific camera to RGB input of a specific display device. A color space is a representation of colors described by a certain choice of parameters, e.g. the RGB color space describes colors by a combination of three variables—red, green and blue. The gamut of a device or process is simply the entirety of colors that can be represented by that device or process, within a certain color space. Generally speaking, a gamut is a subset of a color space, as most devices and processes can only realize a smaller subset of a certain color space. A gamut depends on the specific device—different devices using the same standardized color space might still have different gamuts. A specific device, such as a digital camera, will have its own gamut, describing what colors can be accurately captured and transmitted as output by that camera. Similarly, a specific display device, e.g., an emissive or projective device, is only able to display a certain number of colors: those within its gamut.

A digital image may need to be converted from one color space to another, e.g., to be displayed on a TV after being captured by a camera. A color in the original digital image which lies within a first color space may fall outside the gamut of the second color space, in which case it cannot be displayed in the second color space. In fact, different color spaces are able to accurately represent different colors. For example, a highly saturated (deep) red can be represented in the RGB color space, but not in the CMYK color space. Image processing attempts to solve this problem by some type of transformation (mapping) which converts the color outside a certain gamut to a different color inside that gamut, e.g., gamut mapping.

Gamut mapping can be done in different ways, but it is generally not a simple matter of preserving as much as possible an affinity between the original color outside the gamut and the replacement color inside the gamut. The human eyes perceive colors in a way that is relative to nearby colors in a specific image, therefore it is generally necessary, in gamut mapping, to take into consideration the other colors present in a picture. A simple example would be an image which contains two different gradations of red, one outside and one inside the gamut of the color space in which an image has to be described. If the red out of gamut is simply transformed into a red inside the gamut, any perceptual difference between the original two reds might be inadvertently canceled, by making the two reds, now both inside the gamut, too similar to each other. In that case, it might be necessary to transform not only the original red out of gamut, but also the original red inside of gamut, in such a way as to keep them both inside the gamut, but maintain a difference when perceived by the human eyes.

Gamut mapping is generally performed in a tristimulus color space defined by a particular RGB standard or a color space easily derived from the original RGB data such as YCbCr. The difficulty with this overall tactic is that "red", "green", and "blue" are perceptual entities within which all the complexity of human color perception is buried. For example, gamut mapping often strives to maintain hue, but what exactly is hue in terms of RGB? There is an inherent circularity here: all these approaches to gamut mapping are only as good as the total knowledge of color perception. To overcome these problems, the present disclosure operates not in the perceptual color space of RGB, but rather in a physical space describing actual light spectra. This method is successful because human perception evolved to interpret the behavior of light in the real world and the embodiments of the present disclosure emulate the behavior of light spectra as opposed to some choice of RGB which may not have anything to do with real-world light behavior.

A color space is generally three-dimensional, thus being described by three parameters. In PCT Patent Application No. PCT/US2012/070837 for "Spectral Synthesis for Image Capture Device Processing", filed on Dec. 20, 2012, and PCT Patent Application No. PCT/US2012/070855 for "Spectral Image Processing", filed on Dec. 20, 2012, the disclosure of each of which is incorporated herein by reference in its entirety, the advantage of a substantially rectangular spectral representation for a color is described. By way of example and not of limitation, by following the method described in these two applications, it can be possible for image processing with a substantially rectangular spectral representation to use the variables I, $\lambda_\uparrow$ and $\lambda_\downarrow$, where I is the spectral intensity or amplitude of the color, $\lambda_\uparrow$ is the wavelength at which the amplitude of a substantially rectangular spectrum transitions from zero to I, and $\lambda_\downarrow$ is the wavelength at which the amplitude of a substantially rectangular spectrum transitions from I to zero. Referring to FIG. 1A of the present application, the meanings for I (140), $\lambda_\uparrow$ (150) and $\lambda_\downarrow$ (155) are readily apparent.

An alternative set of parameters for a color space with a substantially rectangular spectral representation, instead of I, $\lambda_\uparrow$ and $\lambda_\downarrow$, is that of I, $\lambda_c$ and $\lambda_{bw}$, where I has the same meaning of spectral intensity or amplitude of the color as above, $\lambda_c$ is the central wavelength of the substantially rectangular spectral representation of a color (therefore determining its hue, e.g., orange, yellow orange, yellow . . . ), and $\lambda_{bw}$ is the bandwidth, or the span of wavelengths where the color has an intensity different from zero. Referring to FIG. 1A, the meanings for I (140), $\lambda_c$ (156) and $\lambda_{bw}$ (160) are readily apparent.

Conversion from the set [I,$\lambda_\uparrow$,$\lambda_\downarrow$] to [I,$\lambda_c$,$\lambda_{bw}$] can be done using the following steps:

```
if (λ↑ < λ↓) { /band-pass/
    λc = (λ↑ + λ↓) / 2;
    λbw = λ↓ - λ↑;
} else { /band-stop/
    λc = (λ↑ + λ↓ + Λ) / 2;
    λbw = λ↓ - λ↑ + Λ;
}
``` where $\Lambda=\lambda_{max}-\lambda_{min}$, that is the difference between the maximum and the minimum wavelengths perceivable by human vision. Referring to FIG. 1A, the meanings for $\Delta_{max}$ (170) and $\Delta_{min}$ (175) are readily apparent. The above steps differentiate between two possible conditions: band-pass and band-stop. Those skilled in the art will readily recognize such standard terminology. The meaning for band-pass and band-stop is also apparent from FIG. 1B.

In particular, referring to FIG. 1B, the band-pass condition (180) occurs when the substantially rectangular spectrum is continuous within the $\lambda_{max}$ and $\lambda_{min}$ boundaries. In other words, the color has an intensity different from zero only in one region. The band-stop condition (181) occurs when the substantially rectangular spectrum is non-continuous within the $\lambda_{max}$ and $\lambda_{min}$ boundaries. In other words, the color has an intensity different from zero in two distinct regions. As seen in FIG. 1B, the band-stop condition may have one of the two distinct regions extending for a greater length in the vicinity of $\lambda_{min}$ (182) or alternatively in the vicinity of $\lambda_{max}$ (183).

Figure 2:
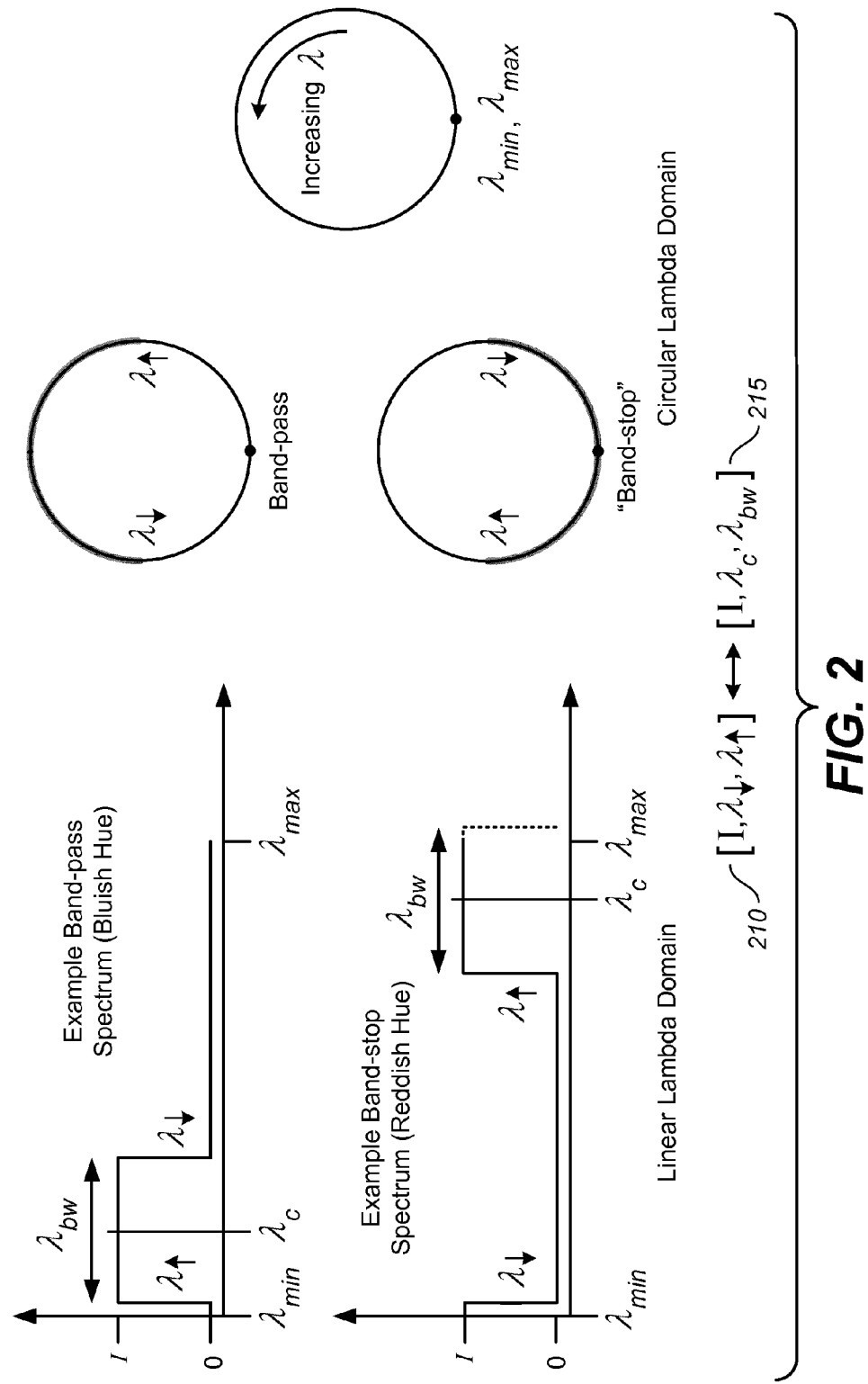
FIG. 2 depicts a substantially rectangular representation for colors according to a previous disclosure.

The representation in FIG. 1B for the band-pass (180) or band-stop (181) conditions is in a 'linear' axis, the λ axis, referred to in FIG. 2 as 'linear lambda domain' (210). The same information can be pictured in FIG. 2 as 'circular lambda domain' (215). In FIG. 2, the upper and lower limits of the visible spectrum are denoted as $\lambda_{max}$ and $\lambda_{min}$, for the maximum and minimum wavelength, respectively.

A further alternative set of parameters for a color space with a substantially rectangular spectral representation adopts the parameters [I,$\lambda_c$,r], where I and $\lambda_c$ have the same meaning as above, and r is derived from $\lambda_{bw}$ according to the equation $$r = 1 - \frac{\lambda_{bw}}{\lambda_{max} - \lambda_{min}}.$$

The meaning of r can be understood in terms of saturation: r is the saturation parameter of the color, which relates to the bandwidth of that color (i.e., the width of the substantially rectangular spectral representation, broadly defined). As those skilled in the art can appreciate, the three sets of variables $[I,\lambda_\uparrow,\lambda_\downarrow]$, $[I,\lambda_c,\lambda_{bw}]$ and $[I,\lambda_c,r]$ are mathematically related by way of simple linear transformations. One advantage of the set $[I,\lambda_c,r]$ is that it can be readily expanded for use not only of substantially rectangular spectral representations, but also in a different spectral representation which is introduced in the present disclosure, referred to as smooth spectral representation.

A substantially rectangular spectral representation can be considered an improvement over traditional gamut mapping techniques. A further improvement to gamut mapping can be obtained by using yet another representation for colors, which constitutes a refinement of the substantially rectangular representations. At the cost of an increase in complexity, but with the advantage of increased accuracy, a representation is disclosed herein which uses smooth functions to represent colors instead of substantially rectangular functions. By a "smooth function" or "smooth spectrum" a function intended to represent a color is meant which is differentiable over the majority of its domain, possibly comprising a few points where its derivative does not exist. Referring to FIG. 1A, an example of a smooth spectrum (190) is given.

In some cases, the substantially rectangular spectral representation described in the previous and present disclosures can have the disadvantage of presenting sharp transitions in the value of the functions. While having the advantage of mathematical simplicity, in some cases such sharp transitions may not lead to a great accuracy in the representation of colors.

Therefore, according to separate embodiment, the spectral representation may comprise smooth functions to represent colors. The advantage of using smooth functions is that they resemble natural, real and physical spectra, thereby allowing a greater accuracy to be reached in color representation and gamut mapping.

In the smooth spectrum representation of the present disclosure, the variable I retains its significance as substantially indicating the intensity of a color, although now it is intended as the peak value of a smooth function representing a color; the variable $\lambda_c$ similarly retains its significance as substantially indicating the hue of the color, although now it is intended as the wavelength of the peak of the smooth function. The saturation parameter also retains its significance as substantially indicating the saturation of a color, if it is related now to the average wavelength bandwidth $\langle\lambda_{bw}\rangle$ of the smooth function. The effective visual intensity, or luminance, is a function of both the spectral peak amplitude I and the average bandwidth $\langle\lambda_{bw}\rangle$.

The saturation parameter r for smooth spectra can then be defined by the equation:

$$r = 1 - \frac{\langle\lambda_{bw}\rangle}{\lambda_{max} - \lambda_{min}}$$

where $\langle\lambda_{bw}\rangle$ is defined by $$\langle\lambda_{bw}\rangle = \frac{1}{\max[s(\lambda)]}\int_{\lambda_{min}}^{\lambda_{max}} s(\lambda)d\lambda$$

wherein s is a spectrum intensity, function of the wavelength $\lambda$.

Examples of smooth functions to be used in spectral representation comprise, by way of example and not of limitation, Gaussian and/or cosine squared functions. In one embodiment, smooth spectra comprise cosine squared functions, for their advantageous symmetry, continuity of derivatives, and analytic expressions to calculate integrals.

The smooth spectra $s_{cr}$ comprising cosine squared functions can be defined as:

$$s_{cr}[\lambda; I, \lambda_c, r] =$$

$$\begin{cases} I\left[f_w(r) + (1-f_w(r))\cos^2\left(\frac{\pi}{2w(r)}\|\lambda-\lambda_c\|\right)\right], & \text{if } \|\lambda-\lambda_c\| \le w(r) \\ I[f_w(r)], & \text{otherwise} \end{cases}$$

Subject to the constraints:

$$w(r) \le \frac{\Lambda}{2}$$

$$f_w(r)\Lambda + (1-f_w(r))w(r) = \Lambda(1-r)$$

wherein $\lambda$ is the wavelength; I is the intensity; $\lambda_c$ is the peak wavelength; $\Lambda$ is the maximum possible bandwidth, that is $\Lambda=\lambda_{max}-\lambda_{min}$; r is the saturation parameter, defined avove; $f_w$ is a function which describes the amount of whitening (in other words, the amount of wide bandwidth, or white color, added to a certain spectrum); and w is a function which represents the half-width of the cosine square peak. Those skilled in the arts will know the general characteristics intended to as white color in image processing, and how different specific definitions of white can be used. These standard definitions are not intended as a limitation of the present disclosure, as $f_w$ and w represent functions of a general nature as described herein, to be defined in detail depending on the specific desired characteristic during image processing.

Figure 7:
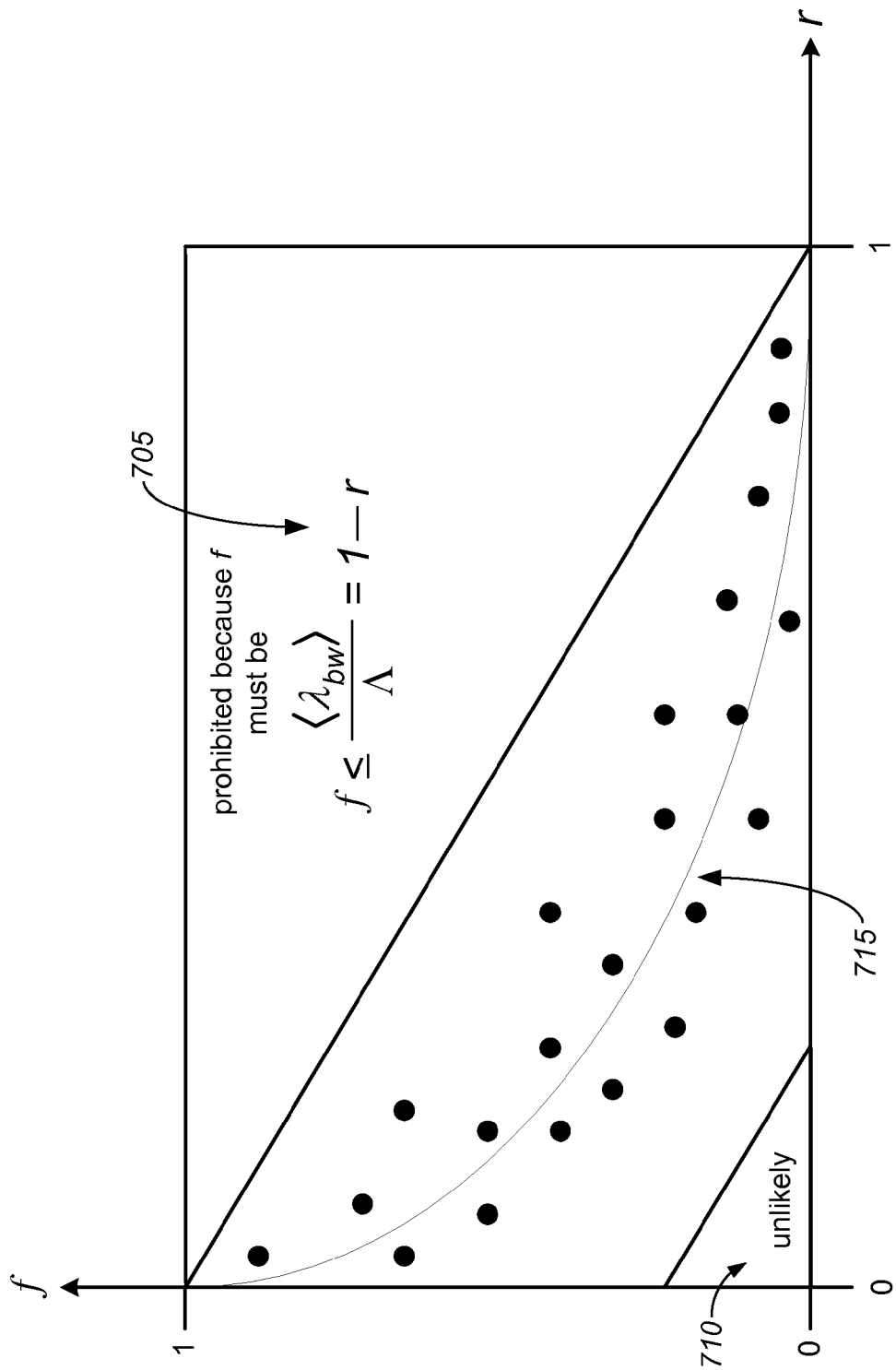
FIG. 7 depicts an exemplary fraction of white representation for an emissive device, according to an embodiment of the present disclosure.

Referring to FIG. 7, in one exemplary embodiment the function $f_W(r)$ decreases monotonically from a value of 1 at r=0. The function $f_W(r)$ can be tuned to match the statistics of real objects. In FIG. 7, the upper shaded triangle (705) is prohibited by the mathematical constraints of the equation set above in the cosine square spectral representation described herein, above. The lower, smaller, shaded triangle (710) is physically unlikely. A likely, exemplary form for $f_W(r)$ is indicated in FIG. 7 (715).

Figure 8:
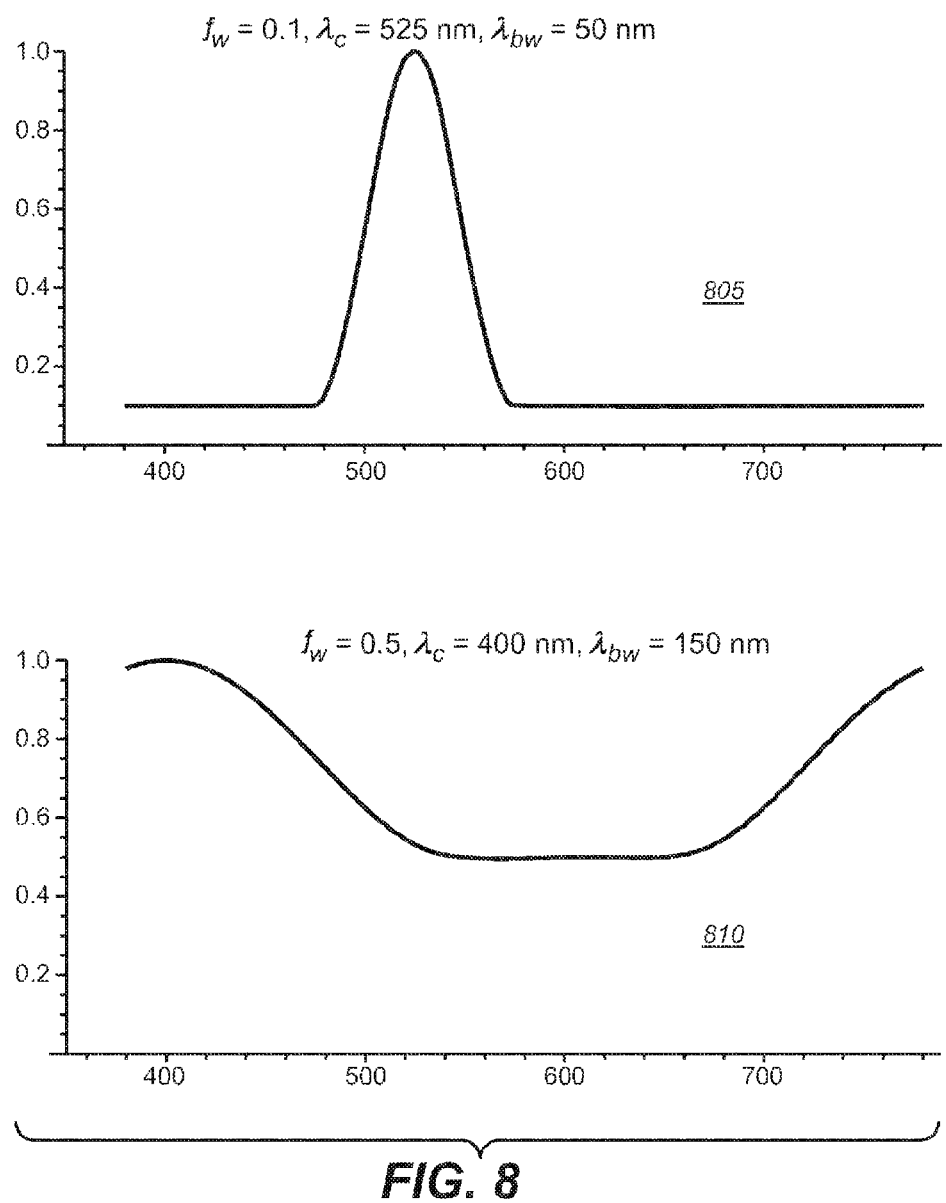
FIG. 8 depicts an example of two smooth spectra, according to an embodiment of the present disclosure.

FIG. 8 depicts an exemplary embodiment of smooth spectral functions comprising cosine squares. One example (805) depicts a cosine square based smooth function with $f_w(r)=0.1$, $\lambda_c=525$ nm, and $\langle\lambda_{bw}\rangle=50$ nm. Another example (810) depicts a cosine square based smooth function with $f_w(r)=0.5$, $\lambda_c=400$ nm, and $\langle\lambda_{bw}\rangle=150$ nm.

In an example embodiment of the disclosure, a method for characterizing a target image for display on a display device, based on input color values is presented, the input color values being based on an input spectrum of an image, the method comprising: providing the input color values, wherein each input color value is associated with a corresponding analysis function; determining an intensity parameter; determining a dominant wavelength parameter; determining a saturation parameter; determining a gamut representation for at least one pixel of the characterized target image, the gamut representation comprising a first gamut ratio directed at the saturation parameter of the at least one pixel, and a second gamut ratio directed at the intensity parameter of the at least one pixel; using a threshold value to determine from at least one of the first or the second gamut ratios whether the at least one pixel is out of gamut; if out of gamut, modifying at least one of the first or the second gamut ratios to obtain a desired value with respect to the threshold value.

In another embodiment of the disclosure, a system for image processing is presented, the system comprising: a converter module configured to receive a first set of parameters associated with a first image defined in a first color space, and to translate the first set of parameters into a parameterized set of coordinates, the parameterized set of coordinates based at least in part, on an intensity parameter, a center wavelength parameter, a saturation parameter; a gamut computing module configured to generate from the parameterized set of coordinates, a gamut representation comprising a first gamut ratio directed at the saturation parameter of a at least one pixel, and a second gamut ratio directed at the intensity parameter of the at least one pixel; and a gamut transformation module configured to generate a second image defined in a second color space, the generating comprising using a threshold value to determine from at least one of the first or the second gamut ratios whether the at least one pixel is out of gamut, and if out of gamut, modifying at least one of the first or the second gamut ratios to obtain a desired value with respect to the threshold value.

Certain color spaces, such as tristimulus-based systems and color spaces, do not offer straightforward gamut mapping. Other color spaces, such as spectral or multi-spectral systems and color spaces, offer advantageous image processing techniques. The present disclosure describes a method to apply gamut mapping in a second color space, for example a spectral or multi-spectral color space, after conversion from a first color space, for example a tristimulus-based color space.

As used herein, the term "image capture device" may refer to any device adapted to form an image. The image capture device captures visual information in the form of still or moving pictures. Image information (e.g., image size, image resolution, file format, and so forth) associated with such images may also be stored. Processing of stored information may also be performed. Such image capture devices may include cameras and/or line-scan cameras, flatbed scanners, and other such devices.

As used herein, the term "module" may refer to a unit configured to perform certain functions. Modules may be implemented in hardware, software, firmware or combination thereof.

Figure 1C:
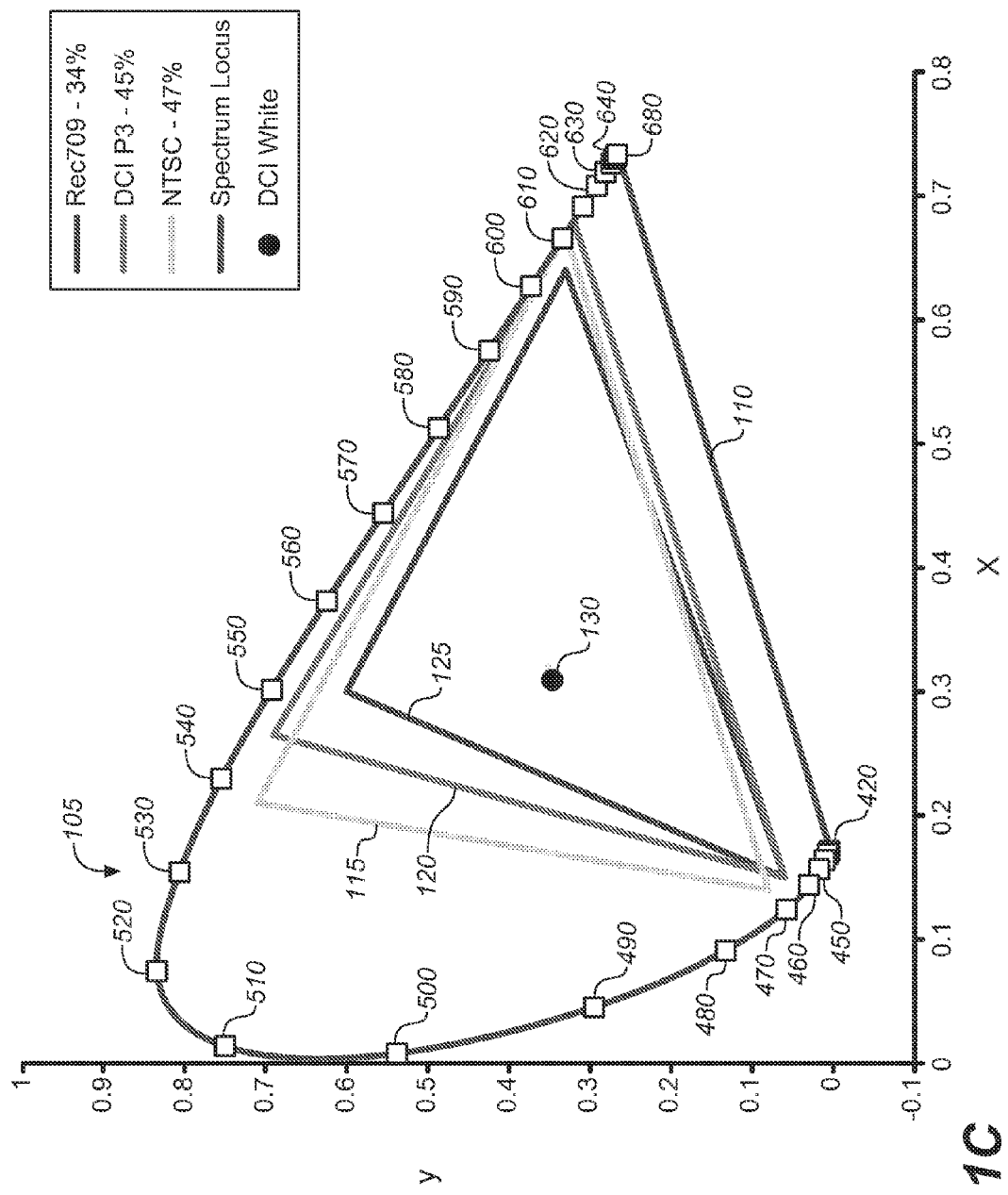
FIG. 1C depicts different exemplary standard gamuts within the CIE standard color space.

FIG. 1C depicts a comparison between several common RGB gamuts in the CIE 1931 xy color space. They all lie within the xy chromaticity diagram format defined by the standard CIE 1931. In the xy diagram, a boundary is defined by a horseshoe shape (105) and a straight line (110) between the two ends of the horseshoe shape. The outer boundary of the horseshoe shape (105), the spectrum locus, is where the pure colors reside, ranging from a wavelength of $\lambda_{min}$ (here ~420 nm, e.g. violet) to $\lambda_{max}$ (here ~680 nm, e.g. red). The straight line between the $\lambda_{min}$ point and the $\lambda_{max}$ point (110) represents color mixtures of red and blue, and it is called the magenta line.

Within this range of possible colors, different RGB color spaces are able to represent a subset of the possible colors. For example, the NTSC television standard (115) has a coverage of 47%, the DCI cinema standard (120) has a coverage of 45%, while the Rec. 709 high definition TV standard (125) has a coverage of 34%.

Starting from the boundary and moving towards the inside of the horseshoe shape decreases saturation (or, similarly expressed, increases the wavelength bandwidth), and as a consequence colors turn to white. The black dot (130) indicates the white color as defined by the DCI cinema standard, as an example.

Figure 1D:
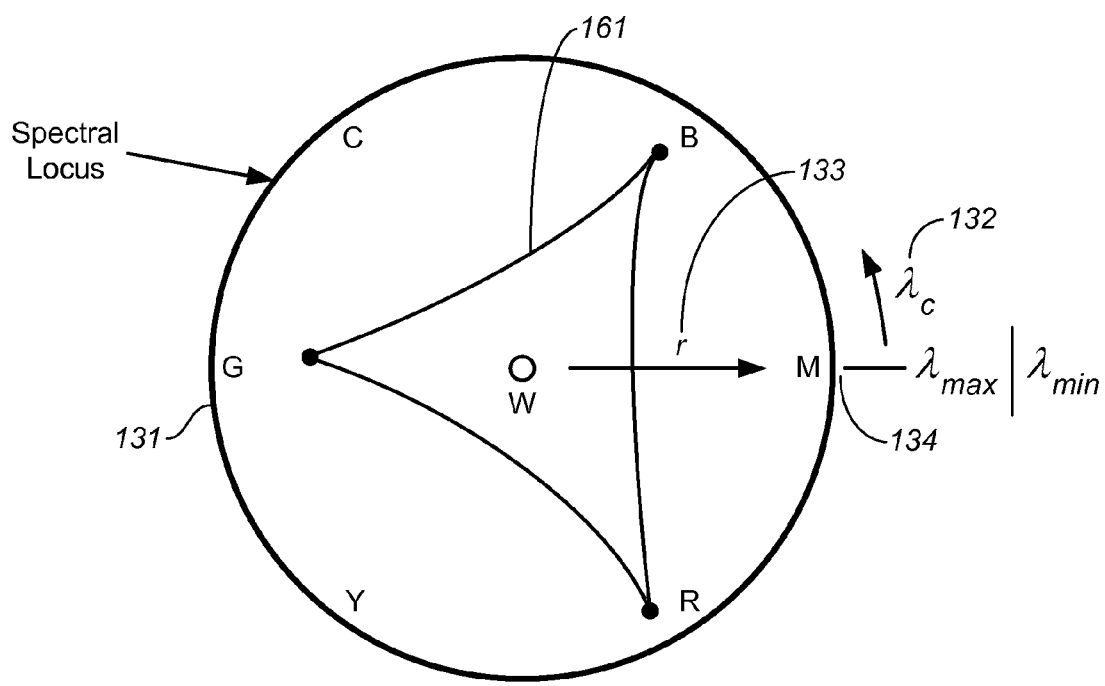
FIG. 1D depicts an exemplary standard gamut within the $[I,\lambda_c,r]$ color space according to the present disclosure.

FIG. 1D depicts an exemplary RGB color space in the domain of the spectral parameters $\lambda_c$ (the angular co-ordinate, 132) and r (the radial co-ordinate, 133). The boundary of this diagram is precisely the spectral locus (131). The magenta line (110) in FIG. 1C collapses (as it should) to a single point, the $\lambda_{min}|\lambda_{max}$ point (134). This representation is closer to overall visual perception. Note that the edges of a typical RGB gamut now curve inward; illustrating the well-known fact that the secondary colors (CMY) will be less saturated than the primary RGB colors.

In general, in gamut mapping the most interesting mappings are those that scale linearly with intensity. That is:

$$\text{If } [I, \lambda_c, r] \leftrightarrow C_i^X, \text{then } [\tau I, \lambda_c, r] \leftrightarrow \tau C_i^X$$

wherein the significance of the variables will be obvious, to those skilled in the art, from the above discussion of the present disclosure, and $\tau$ is a real number; the X parameter can refer to, by way of example and not of limitation, a camera or the cones of human eyes. Chromaticity is the scale invariant portion of a representation. For the spectral model of the present disclosure, scale is explicitly encapsulated in the I channel and therefore $(\lambda_c, r)$ are the chromaticity co-ordinates.

A tristimulus color space is three-dimensional, but normally it is sliced into two-dimensional planes, one plane for each value of the third variable. The two-dimensional planes indicate chrominance (their variables are x and y as in the axis of FIG. 1C), while the third variable indicates luminance. Similarly, the color space in which images are processed in one embodiment of the present disclosure is defined by a solid, representing the total gamut which can be represented by a device. By way of exemplification, in one embodiment the three independent variables of a color space are separated into two subsets, one subset including one variable, and the other subset including two variables—in other words, the three-dimensional space is divided into a one-dimensional space and a bi-dimensional space. However, in other embodiments a different technique may be used, where the two variables are a different subset of the three variables, and in other embodiments all three variables may be used simultaneously for optimization of gamut mapping.

Figure 3:
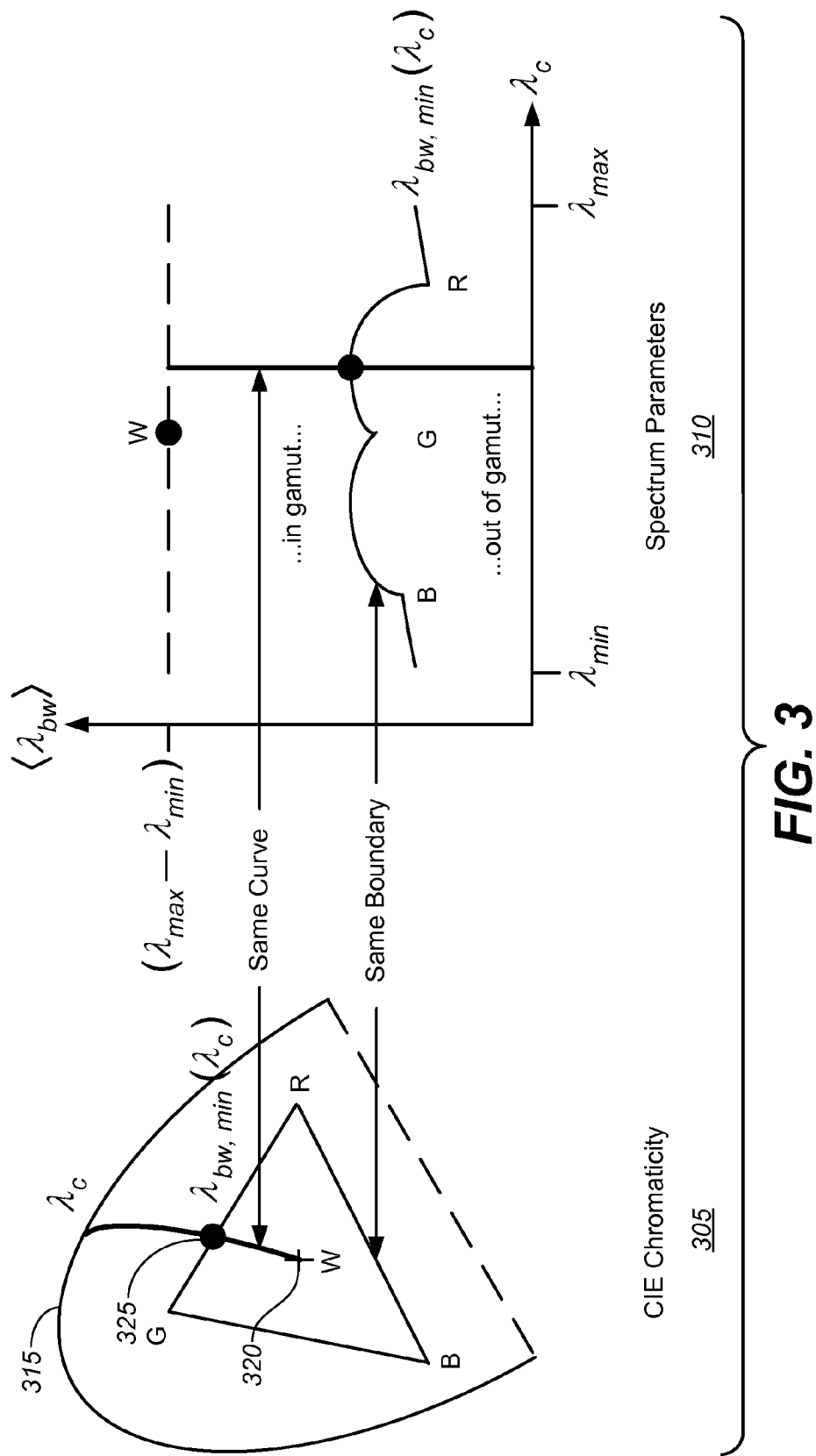
FIG. 3 depicts an example of gamut mapping according to an embodiment of the present disclosure.

FIG. 3 depicts an example of a transformation between a two-dimensional representation of an RGB chromaticity space (305) and a bi-dimensional (rectangular) spectral representation of a color (310), according to one embodiment of the present disclosure. Let $\lambda_c$, the hue of a color, be fixed and only vary the average bandwidth. As the color moves away from the spectrum locus (315) towards the white point W (320), its saturation decreases, and the average $\lambda_{bw}$ increases. This crosses the gamut at one point (325) of the RGB chromaticity triangle boundary, assuming the value $\lambda_{bw,min}$; this is the minimum bandwidth, or maximum saturation, that can be represented within the gamut. More saturated colors, those with a smaller bandwidth, which could be characterized as more pure, are outside the gamut of FIG. 3.

Figure 4:
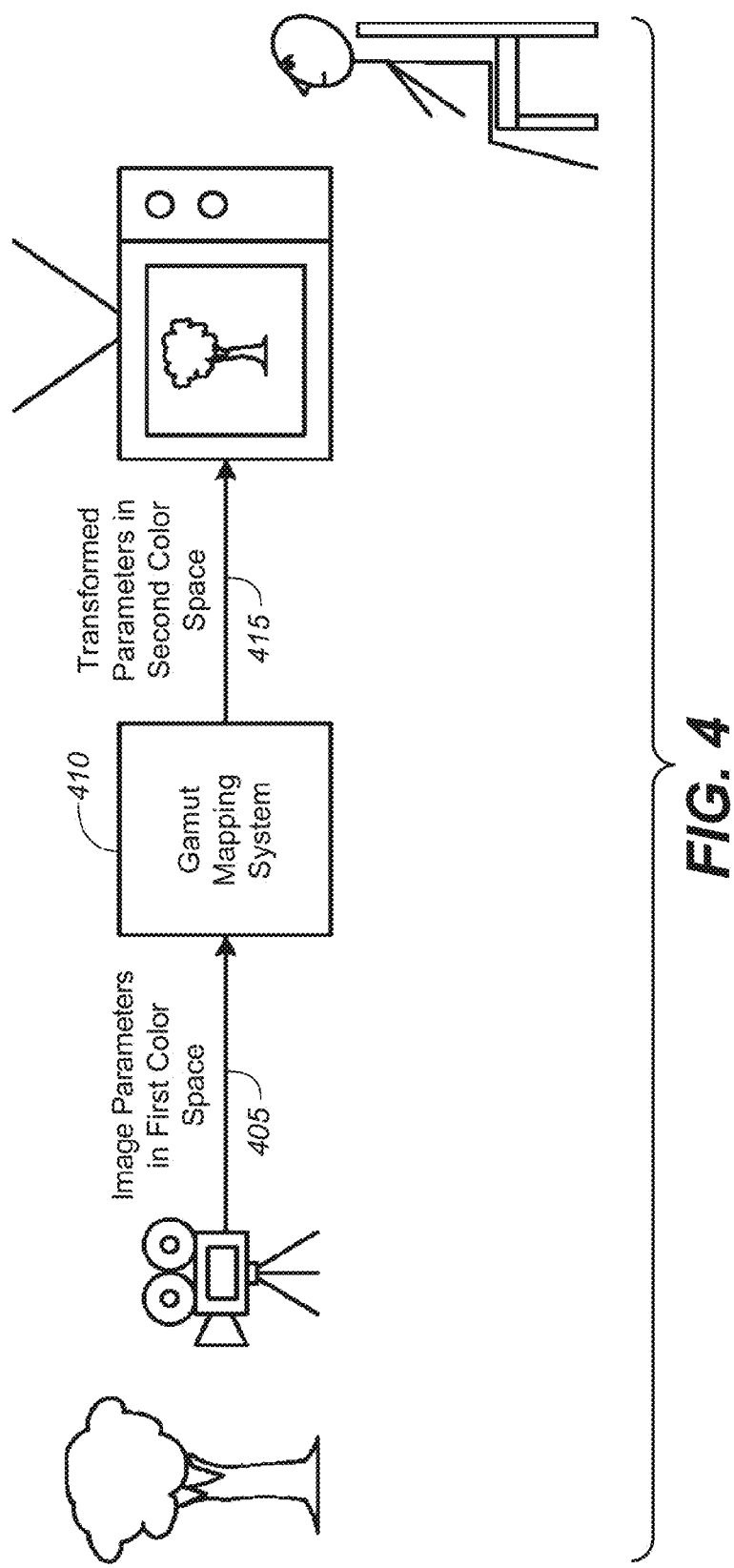
FIG. 4 depicts an image processing application for a gamut mapping method in accordance with an embodiment of the present disclosure.
Figure 5:
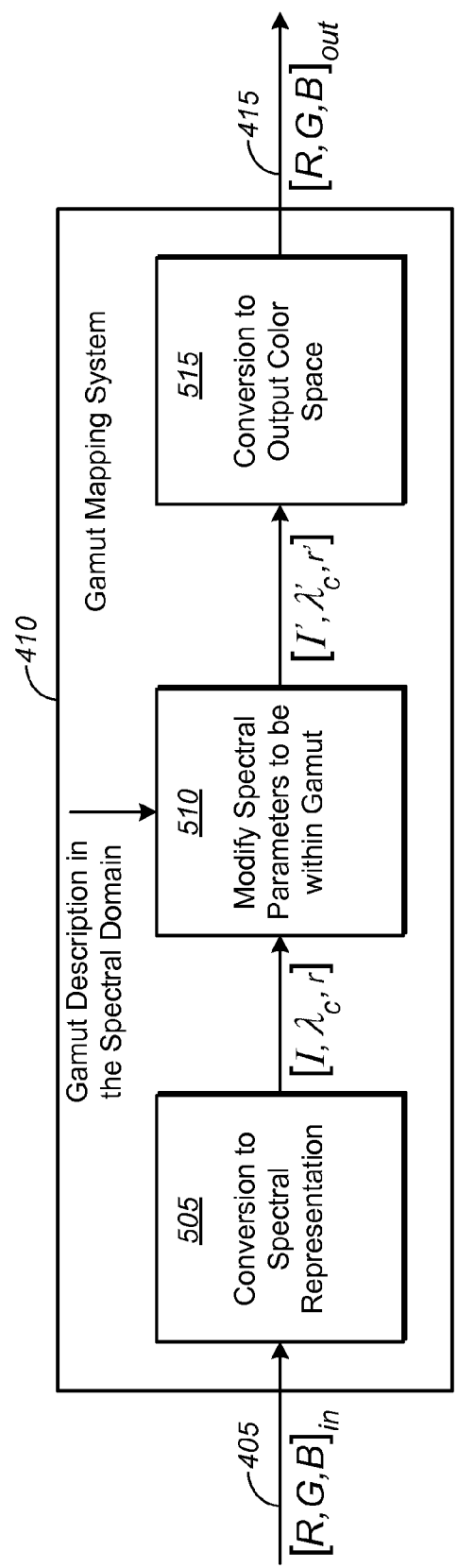
FIG. 5 depicts an exemplary gamut mapping system.

FIG. 4 depicts a gamut mapping method in accordance with an embodiment of the present disclosure. FIG. 5 depicts the gamut mapping system of FIG. 4, comprising an input conversion module (505), a gamut limiting module (510), and an output conversion module (515).

Referring now to FIG. 4, the image parameters of a target image (405) are produced by a capture device in a first color space, comprising, by way of example and not of limitation, a luminance variable and two variables for chrominance. These values are input to the gamut mapping system (410), which outputs the transformed image parameters in a second color space (415), to be displayed on a display device.

Referring to FIG. 5, the gamut mapping system accepts the image parameters in a first color space (405) and, through a converter module (505), converts them into spectral parameters. By way of example and not of limitation, such converter module (505) may implement a conversion from a tristimulus-based color space to a substantially rectangular spectral color representation. As another example, the converter module (505) may implement a conversion from a tristimulus-based color space to a color representation parametrized by I, $\lambda_c$ and r as described in the present disclosure. As a further example, the converter module (505) may implement a conversion from a tristimulus-based color space to a smooth spectra color representation.

In one embodiment of the present disclosure, the image parameters in the spectral color space are based at least in part on: an intensity variable, I, which describes the intensity of a color; a central wavelength, $\lambda_c$, which relates to the hue of a color; a saturation parameter, r, which relates to how "pure" the hue of a color is.

Figure 9A:
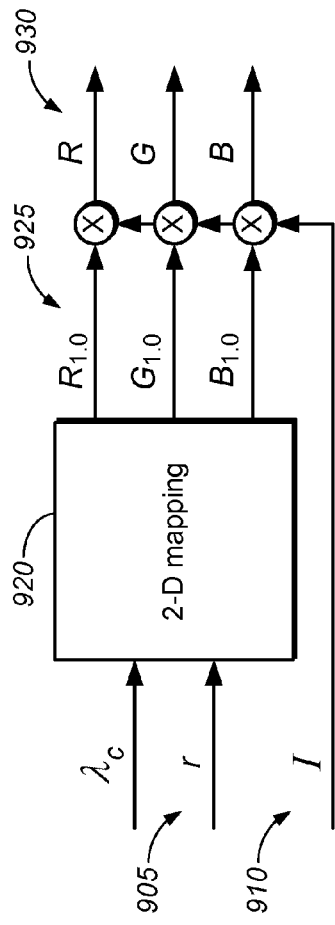
FIG. 9A depicts an exemplary method for transformation from a parameterized spectral representation to a conventional RGB color space, according to an embodiment of the present disclosure.
Figure 9B:
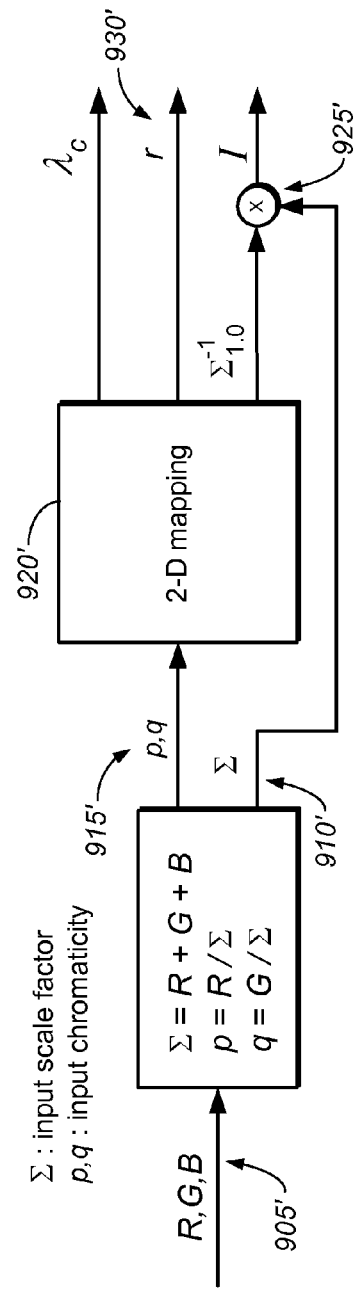
FIG. 9B depicts an exemplary method for transformation, according to an embodiment of the present disclosure, from RGB to spectral parameters.

The converter module (505) can be implemented in a variety of ways, one of which is illustrated in FIG. 9B. Referring to FIG. 9B, conversion from RGB is implemented by a method comprising: obtaining three quantities R, G, B (905'); extracting an intensity parameter by using a scale factor Σ (910'), thus obtaining two chromaticity coordinates p and q (915'); applying 2D mapping through a look-up table (LUT) (920'); reapplying the scale factor Σ (925'); obtaining the three quantities I, $\lambda_c$ and r (930').

The 2-D mapping in the look-up table 920' is defined implicitly by the equations:

$s(\lambda;\lambda_c,r)$=unit amplitude spectrum parameterized by [$\lambda_c,r$]

$\bar{r}(\lambda),\bar{b}(\lambda),\bar{g}(\lambda)$=spectral sensitivities characterizing the input RGB $L(\lambda)$=illuminant spectrum $R_{1.0},G_{1.0},B_{1.0}$=RGB for the unit amplitude spectra $s(\ldots)$ $R_{1.0}=\int_{\lambda_{min}}^{\lambda_{max}}\bar{r}(\lambda)s(\lambda;\lambda_c,r)L(\lambda)d\lambda$ $G_{1.0}=\int_{\lambda_{min}}^{\lambda_{max}}\bar{g}(\lambda)s(\lambda;\lambda_c,r)L(\lambda)d\lambda$ $B_{1.0}=\int_{\lambda_{min}}^{\lambda_{max}}\bar{b}(\lambda)s(\lambda;\lambda_c,r)L(\lambda)d\lambda$ $\Sigma_{1.0}=R_{1.0}+G_{1.0}+B_{1.0}$ $p=R_{1.0}/\Sigma_{1.0}$ $q=G_{1.0}/\Sigma_{1.0}$ $\Sigma_{1.0}^{-1}=1/\Sigma_{1.0}$ where the significance of the terms has been defined previously in the present disclosure, or will be known by the person skilled in the art.

In practice, the 2-D mapping can be implemented as a table with interpolation. The table itself is determined by evaluating p and q for a relatively fine sampling of [$\lambda_c,r$] followed by interpolation to the exact values of p and q that will be input addresses to the table.

Analogously to the input conversion module (505), the output conversion module (515) transforms data in a spectral representation, such as [I, $\lambda_c$, r] into a conventional RGB representation for display. The output converter module can also be implemented in different ways, including a 2-D mapping. In this case the mapping is explicitly defined by the equations:

$s(\lambda;\lambda_c,r)$=unit amplitude spectrum parameterized by [$\lambda_c,r$]

$\bar{r}(\lambda),\bar{b}(\lambda),\bar{g}(\lambda)$=spectral sensitivities characterizing the input RGB $L(\lambda)$=illuminant spectrum $R_{1.0},G_{1.0},B_{1.0}$=RGB for the unit amplitude spectra $s(\ldots)$ $R_{1.0}=\int_{\lambda_{min}}^{\lambda_{max}}\bar{r}(\lambda)s(\lambda;\lambda_c,r)L(\lambda)d\lambda$ $G_{1.0}=\int_{\lambda_{min}}^{\lambda_{max}}\bar{g}(\lambda)s(\lambda;\lambda_c,r)L(\lambda)d\lambda$ $B_{1.0}=\int_{\lambda_{min}}^{\lambda_{max}}\bar{b}(\lambda)s(\lambda;\lambda_c,r)L(\lambda)d\lambda$ One embodiment of module (515) is illustrated in FIG. 9A. The intensity I (910) and [$\lambda_c$, r] (905), constitute a spectral representation. A 2-D mapping (920) is executed to obtain three unit amplitude RGB values (925), which are then modified to take into account the intensity (910), to obtain the final RGB values (930).

Referring again to FIG. 5, the modification of spectral parameters occurs in module (510). A gamut ratio is then calculated in module (510) for at least one pixel. For example, a gamut ratio is calculated for the saturation parameter r, defined as $$r = 1 - \frac{\langle\lambda_{bw}\rangle}{\lambda_{max}-\lambda_{min}},$$

wherein $\langle\lambda_{bw}\rangle$ is the average bandwidth of the color for this pixel.

The gamut ratio for the saturation parameter r is $$Q_r = \frac{r}{r^{GB}},$$

wherein $r^{GB}$ is the value of r at the boundary of the color space for the $\lambda_c$ value for this pixel, which can be referred to as gamut boundary. The minimum saturation, or minimum value for r, which is zero, is found at the white point inside the gamut, when $\lambda_{bw}=\Lambda$, while the maximum saturation, or maximum value of r, is found for $\lambda_{bw}=\lambda_{bw,min}$, which is at the boundary of the gamut.

The gamut mapping system of FIG. 5 may be implemented, for example, through a computer.

As mentioned herein above, a tristimulus color space is three-dimensional, but normally it is sliced into two-dimensional planes, one plane for each value of the third variable. The two-dimensional planes indicate chrominance (their variables are x and y in the equations above), while the third variable indicates luminance. The color space in which the gamut ratios are calculated in one embodiment of the present disclosure is defined by a three-dimensional solid, representing the total gamut which can be represented by a device.

Figure 6:
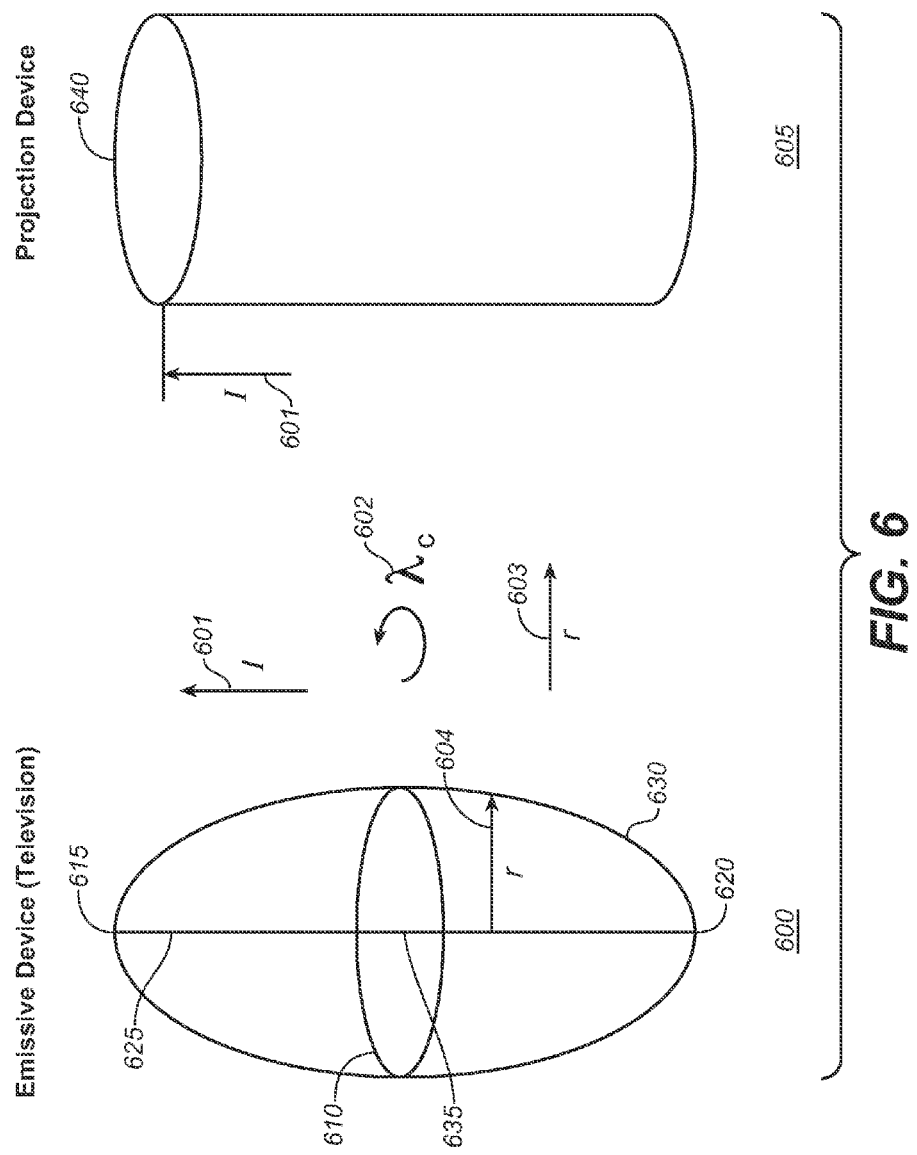
FIG. 6 depicts an exemplary gamut representation for an emissive device, and one for a projection device.

In FIG. 6 two examples are presented: one for an emissive device such as a TV (600), and one for a projection device (605) such as a projector. The variable varying along the longest axis of the ellipsoid and the axis of the cylinder is the intensity variable, I (601). As the intensity is increased in the emissive device of FIG. 6, the available gamut in two dimensions decreases. For example a horizontal, circular slice in FIG. 6 (610) represents the maximum available gamut in two dimensions for the exemplary emissive device (600). This maximum is obtained at the largest horizontal slice possible (610) in the ellipsoid (600). The two ends of the ellipsoid, the top (615) at the bottom (620), are the two points of maximum and minimum intensity I. The color for (615) is white, and the color for (620) is black. The gamut of emissive device (600) is such that as the intensity is increased eventually all color hues become increasingly desaturated and converge into a single point of white intensity (615). Alternatively, as the intensity is decreased eventually all colors converge towards a single point of darkness (620).

In the embodiment of FIG. 6, $\lambda_c$ (602) varies along the surface of the ellipsoid (630)—or surface of a circle for each two-dimensional slice. Thus, the hue of the color varies along the surface in a counterclockwise direction, e.g. red, yellow, orange, green, blue, violet. Since r (603) represents saturation, and it increases from the center of the ellipsoid to the surface (604), in FIG. 6, the maximally saturated colors are located at the surface. The ellipsoid vertical axis (625) from (615) to (620) is the white axis, which varies in intensity I, i.e. going from black (620) to white (615) through varying degrees of white intensity, and passing through the center (635) of circle (610). The center (635) of circle (610) is the white point within the horizontal two-dimensional slice (610).

The variables I, $\lambda_c$ and r retain the same significance in the solid representing the color space of the projection device (605) in FIG. 6, a cylinder (605). The main difference is that, in this idealized example, varying the intensity I conserves the size of the available chrominance, as the horizontal two-dimensional slices of a cylinder, i.e., (640), have all the same diameter, in contrast to an ellipsoid whose horizontal two-dimensional slices have different diameters. The two examples of gamuts in FIG. 6 (600, 605) are not meant to be limiting the scope of this application.

Specifically, it should be understood that the examples of FIG. 6 are convex solids, with convex cross sections. On the other hand, the cross sections of the actual solids for the spectral representation [I, $\lambda_c$, r] would have concave cross sections. In particular, referring to FIG. 1D, the concave triangular shape (161) would be representative of an actual cross section.

Referring again to FIG. 5, a gamut ratio for the intensity parameter I can also be calculated in module (510), following the formula $$Q_I = \frac{I}{I^{GB}},$$

wherein $I^{GB}$ is the value of I at the boundary of the color space, which can be referred to as gamut boundary.

Having calculated one or more gamut ratios in module (510), the Q value is compared with a threshold value to determine whether the color of the pixel under consideration is outside or inside the gamut boundary. The desired values for $Q_r$ and $Q_I$ correspond to $Q_r<1$ and $Q_I<1$, respectively.

Once it has been established whether a pixel is out of gamut or not, any of the three parameters I, $\lambda_c$ and r can be transformed, depending on the desired outcome, to bring the pixel inside of gamut. By way of example and not of limitation, the intensity I or saturation r could be changed while keeping the central wavelength $\lambda_c$ constant, having thus the advantage of keeping the hue of the color unchanged. Or the saturation could be kept constant while changing the hue. Those skilled in the art will appreciate that several combinations are possible, depending on the desired effect. One notable advantage of using the three parameters I, $\lambda_c$ and r over more traditional variables is that it is relatively easier to keep the hue of the color constant, as it is one of the three variables. In traditional standards the hue is a function of the two variables which define chrominance, e.g., x and y in FIG. 1C. In other situations, though, it might be preferable to maximize saturation while the preservation of the exact hue is not as important. For example, a certain hue, e.g. red, might be well defined in an image, and present in different parts of the image with a wide range of saturation values, from very low to very high saturation values. Thus the image might contain very highly saturated red with a well defined hue of red. However, the highly saturated hue of red might be outside the gamut in which it is intended to represent the image. In this example, different choices might be used for gamut mapping. For example, the saturation might be reduced to keep the hue constant. An alternative, however, if the saturation is deemed more important than the specific hue, would be to change the hue in order to keep the saturation at the maximum value permitted by the specific gamut into which the colors are being mapped. To conclude this example, after gamut mapping the specific hue of red could have changed to a degree (it might have veered towards a redder hue rather than a bluer hue), but the red would still be present in a wide range of saturation values, from low saturation, to the highest saturation permitted by the gamut into which the colors were mapped.

Once the desired transformation has been processed, the target image, now parametrized in a different color space or gamut than the original, is ready to be transmitted to a display device. In another embodiment of the present disclosure, gamut mapping is implemented from a color space representing raw sensor outputs or an RGB color space, into the [I,$\lambda_c$,r] space with a smooth spectra color representation. An example of such an embodiment is depicted in FIG. 9B.

Figure 10:
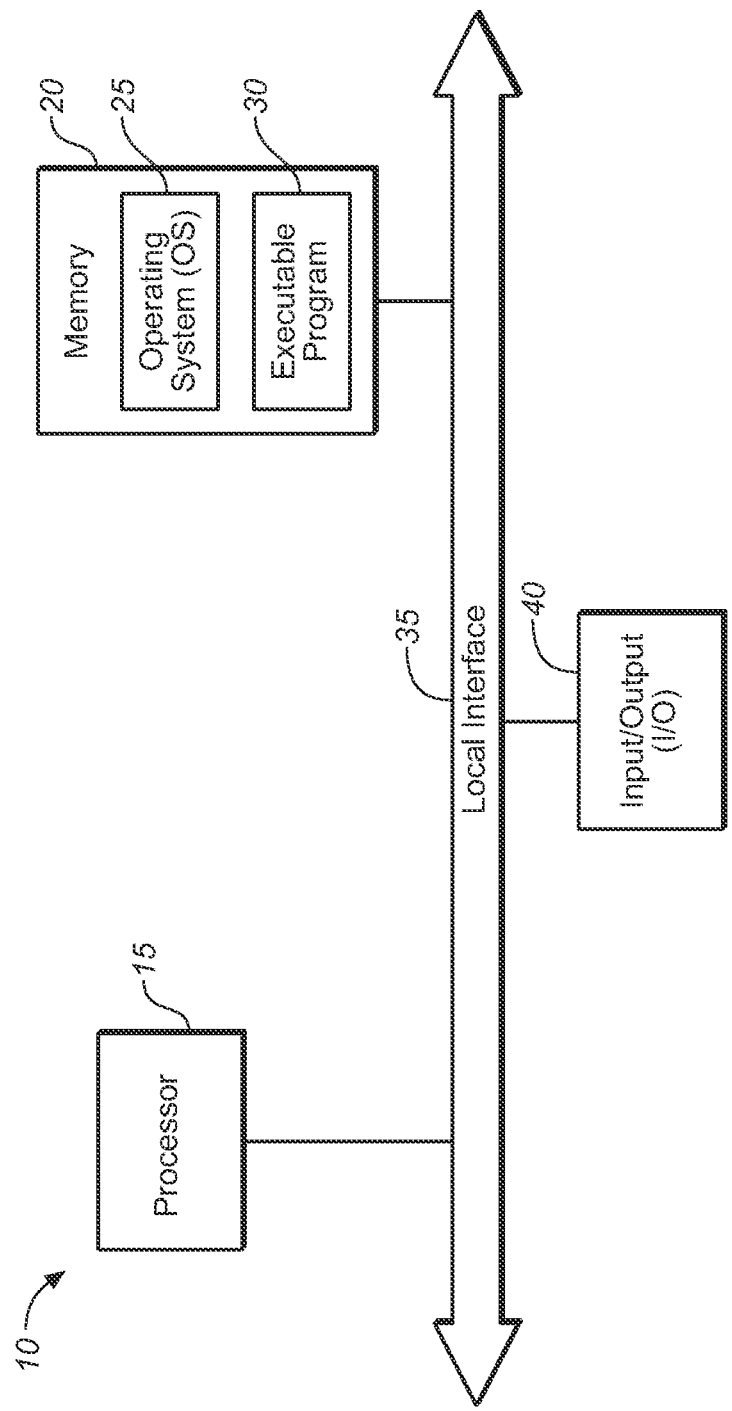
FIG. 10 depicts an exemplary embodiment of a target hardware for implementation of an embodiment of the present disclosure.

FIG. 10 is an exemplary embodiment of a target hardware (10) (e.g. a computer system) for implementing the embodiment of FIGS. 4 and 5. This target hardware comprises a processor (15), a memory bank (20), a local interface bus (35) and one or more Input/Output devices (40). The processor may execute one or more instructions related to the implementation of FIGS. 4 and 5, and as provided by the Operating System (25) based on some executable program stored in the memory (20). These instructions are carried to the processors (20) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 10. In some embodiments a plurality of processors may be used in a parallel configuration for added execution speed. In such a case, the executable program may be specifically tailored to a parallel execution. Also, in some embodiments the processor (15) may execute part of the implementation of FIGS. 4 and 5, and some other part may be implemented using dedicated hardware/firmware placed at an Input/Output location accessible by the target hardware (10) via local interface (35). The target hardware (10) may include a plurality of executable program (30), wherein each may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

A number of embodiments of the disclosure have been described. Nevertheless, it will be understood that various modifications may be made without departing from the spirit and scope of the present disclosure. Accordingly, other embodiments are within the scope of the following claims.

Examples of additional embodiments comprise the following embodiments.

In a first embodiment, a method is described based on claim 2, wherein the saturation parameter is represented by a first equation $$r = 1 - \frac{\lambda_{bw}}{\Lambda},$$

where r is the saturation parameters, $\lambda_{bw}$ is the width of a substantially rectangular spectral representation and the first gamut ratio is represented by a second equation $$Q_r = \frac{r}{r^{GB}},$$

where $r^{GB}$ is the value of r at the gamut boundary.

In a second embodiment, a method is described based on the first embodiment, wherein the threshold value is quantified by $Q_r$, and the desired value corresponds to $Q_r<1$.

In a third embodiment, a method is described based on the first embodiment, wherein the second gamut ratio is represented by an equation $$Q_I = \frac{I}{I^{GB}},$$

where I is the intensity, and $I^{GB}$ is the value of I at the gamut boundary

In a fourth embodiment, a method is described based on the third embodiment, wherein the threshold value is quantified by $Q_I$, and the desired value corresponds to $Q_I<1$.

In a fifth embodiment, a system is described based on claim 20, wherein the saturation parameter is represented by a first equation $$r = 1 - \frac{\lambda_{bw}}{\Lambda},$$

where r is the saturation parameters, $\lambda_{bw}$ is the width of a substantially rectangular spectral representation and the first gamut ratio is represented by a second equation $$Q_r(x, y) = \frac{r}{r^{GB}},$$

where $r^{GB}$ is the value of r at the gamut boundary.

In a sixth embodiment, a system is described based on the fifth embodiment, wherein the threshold value is quantified by $Q_r$, and the desired value corresponds to $Q_r<1$.

In a seventh embodiment, a system is described based on the fifth embodiment, wherein the second gamut ratio is represented by an equation $$Q_I = (x, y) = \frac{I}{I^{GB}},$$

where I is the intensity, and $I^{GB}$ is the value of I at the gamut boundary.

In an eighth embodiment, a system is described based on the seventh embodiment, wherein the threshold value is quantified by $Q_I$, and the desired value corresponds to $Q_I<1$.

In a ninth embodiment, a system is described based on the seventh embodiment, wherein the threshold value is represented by at least one of $$\text{a) } \frac{r}{r^{GB}} = 1, \text{ or b) } \frac{I}{I^{GB}} = 1.$$

The examples set forth above are provided to those of ordinary skill in the art a complete disclosure and description of how to make and use the embodiments of the gamut mapping of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A computer-implemented method for color conversion of an input image defined in a first color space into a target image defined in a second color space for display on a display device, the method comprising:
   receiving, by a processor, image parameters in the first color space, the image parameters defining the input image;
   converting, by a processor, the received image parameters defined in the first color space into spectral parameters defined in a spectral color space,
   wherein the spectral color space is a color space with a rectangular representation of colors, the rectangular representation using rectangular functions of wavelength, or a smooth spectral representation of colors, the smooth spectral representation using smooth functions of wavelength;
   wherein each rectangular function or smooth function is defined by the value of an intensity parameter (I), the value of a central wavelength $\lambda_c$ parameter and the value of a saturation parameter (r), the saturation parameter (r) being directly proportional to the width of the respective rectangular function or smooth function; and
   wherein the spectral parameters in the spectral color space are based at least in part on the intensity parameter (I), the central wavelength $\lambda_c$ parameter and the saturation parameter (r);
   calculating, by a processor, a gamut ratio (Q) for at least one pixel for at least one of the intensity parameter and the saturation parameter, the gamut ratio (Q) indicating a ratio of the value of the at least one of the intensity parameter and the saturation parameter for the at least one pixel and a value of the corresponding at least one of the intensity parameter and the saturation parameter at a gamut boundary;
   comparing, by a processor, the at least one calculated gamut ratio (Q) with a threshold value to determine whether the color of the pixel under consideration is outside or inside the gamut boundary;
   when a pixel is outside the gamut boundary, transforming any of the intensity parameter (I), the central wavelength ($\lambda_c$) and the saturation parameter (r) to bring the intensity parameter (I), the central wavelength ($\lambda_c$) or the saturation parameter (r) inside of the gamut boundary;
   converting, by a processor, the intensity parameter (I), the central wavelength ($\lambda_c$) and the saturation parameter (r) into image parameters defined in the second color space.

2. The method according to claim 1, wherein the intensity parameter (I) is representative of the intensity of a color, and the central wavelength $\lambda_c$ parameter is representative of the hue of a color.

3. The method according to claim 1, wherein the first color space and/or the second color space are perceptual color spaces and/or wherein the spectral color space is a physical color space representative of the actual light spectra.

4. The method according to claim 1, wherein the first color space and/or the second color space are tristimulus-based color spaces.

5. The method according to claim 1, wherein the image parameters of the target image are produced by a capture device.

6. The method of claim 1, wherein the display device is an emissive device.

7. The method of claim 1, wherein the intensity parameter, the center wavelength parameter, and the saturation parameter are derived from a desired color spectrum of the target image.

8. The method of claim 1, wherein calculating a gamut ratio for at least one pixel for the saturation parameter comprises calculating a first gamut ratio directed at the saturation parameter of the at least one pixel, the first gamut ratio having a numerator based on the value of the saturation parameter for the at least one pixel, and a denominator comprising a first gamut boundary value of the saturation parameter for the at least one pixel.

9. The method of claim 8, wherein calculating a gamut ratio for at least one pixel for the intensity parameter comprises calculating a second gamut ratio directed at the intensity parameter of the at least one pixel, the second gamut ratio having a numerator based on the value of the intensity parameter for the at least one pixel, and a denominator comprising a second gamut boundary value of the intensity parameter for the at least one pixel.

10. The method of claim 1, wherein said transforming comprises modifying the value of the center wavelength parameter in order to obtain a desired hue in the target image.

11. The method of claim 1, wherein said transforming is directed at providing a desired characteristic in the target image.

12. The method of claim 9, wherein the saturation parameter is represented by a first equation $$r = 1 - \frac{\langle\lambda_{bw}\rangle}{\Lambda},$$

wherein r is the saturation parameters wherein $\langle\lambda_{bw}\rangle$ is the average wavelength bandwidth of a smooth function and the first gamut ratio is represented by a second equation $$Q_r = \frac{r}{r^{GB}},$$

where $r^{GB}$ is the value of r at the gamut boundary, and A is a difference between boundaries $\lambda_{max}$ and $\lambda_{min}$ of the rectangular function or smooth function.

13. The method of claim 12, wherein comparing the at least one calculated gamut ratio (Q) with the threshold value is based on comparing $Q_r$ to a first threshold value, and the first threshold value corresponds to $Q_r<1$.

14. The method of claim 12, wherein the second gamut ratio is represented by an equation $$Q_I = \frac{I}{I^{GB}},$$

where I is the intensity, and $I^{GB}$ is the value of I at the gamut boundary.

15. The method of claim 14, wherein comparing the at least one calculated gamut ratio (Q) with the threshold value is further based on comparing $Q_I$ to a second threshold value, and the second threshold value corresponds to $Q_I<1$.

16. The method of claim 1, wherein the intensity parameter is the peak amplitude of a spectral function, and the center wavelength parameter is the central wavelength of the peak amplitude of a spectral function.

17. The method of claim 16, wherein the spectral function is a smooth function.

18. The method of claim 17, wherein the smooth function comprises a linear combination of functions, at least one of the functions comprising at least a cosine square function.

19. A system for color conversion of an input image defined in a first color space into a target image defined in a second color space for display on a display device, the system comprising:
- an input conversion module configured to receive image parameters in the first color space, the image parameters defining the input image, and to convert the received image parameters defined in the first color space into spectral parameters defined in a spectral color space,
  wherein the spectral color space is a color space with a rectangular representation of colors, the rectangular representation using rectangular functions of wavelength, or a smooth spectral representation of colors, the smooth spectral representation using smooth functions of wavelength;
  wherein each rectangular function or smooth function is defined by the value of an intensity parameter (I), the value of a central wavelength $\lambda_c$ parameter and the value of a saturation parameter (r), the saturation parameter (r) being directly proportional to the width of the respective rectangular function or smooth function; and
  wherein the spectral parameters in the spectral color space are based at least in part on the intensity parameter (I), the central wavelength $\lambda_c$ parameter and the saturation parameter (r);
- a gamut limiting module configured to calculate a gamut ratio (Q) for at least one pixel for at least one of the intensity parameter and the saturation parameter, the gamut ratio (Q) indicating a ratio of the value of the at least one of the intensity parameter and the saturation parameter for the at least one pixel and a value of the corresponding at least one of the intensity parameter and the saturation parameter at a gamut boundary, to compare the at least one calculated gamut ratio (Q) with a threshold value to determine whether the color of the pixel under consideration is outside or inside the gamut boundary and when a pixel is outside the gamut boundary, to transform any of the intensity parameter (I), the central wavelength ($\lambda_c$) and the saturation parameter (r) to bring the intensity parameter (I), the central wavelength ($\lambda_c$) or the saturation parameter (r) inside of the gamut boundary;
- an output conversion module configured to convert the intensity parameter (I), the central wavelength ($\lambda_c$) and the saturation parameter (r) into image parameters defined in the second color space.

20. The system of claim 19, wherein the gamut limiting module is configured to calculate the gamut ratio for the saturation parameter as a first gamut ratio directed at the saturation parameter of the at least one pixel, the first gamut ratio having a numerator based on the value of the saturation parameter for the at least one pixel, and a denominator comprising a first gamut boundary value based of the saturation parameter for the at least one pixel.

21. The system of claim 20, wherein the gamut limiting module is configured to calculate the gamut ratio for the intensity parameter as a second gamut ratio directed at the intensity parameter of the at least one pixel, the second gamut ratio having a numerator based on the value of the intensity parameter for the at least one pixel, and a denominator comprising a second gamut boundary value of the intensity parameter for the at least one pixel.

22. The system of claim 19, wherein the gamut limiting module is configured to modify the center wavelength parameter in order to obtain a desired hue in the target image.

23. The system of claim 19, wherein said transforming by the gamut limiting module is directed at providing a desired characteristic in the target image.

24. The system of claim 19, further comprising a display device configured to display the target image.

25. The system of claim 24, further comprising an image capture device configured to generate the input image defined in the first color space.

26. The system as claimed in claim 19, wherein the first color space and/or the second color space are perceptual color spaces and/or wherein the spectral color space is a physical color space representative of the actual light spectra.

27. The system as claimed in claim 19, wherein the first color space and/or the second color space are tristimulus-based color spaces.

28. The system as claimed in claim 19, wherein the display device is one of an emissive device or a projection device.

29. The system as claimed in claim 21, wherein the saturation parameter is represented by a first equation $$r = 1 - \frac{(\lambda_{bw})}{\Lambda},$$

wherein r is the saturation parameters wherein ($\lambda_{bw}$) is the average wavelength bandwidth of a smooth function and the first gamut ratio is represented by a second equation $$Q_r(x, y) = \frac{r}{r^{GB}},$$

where $r^{GB}$ is the value of rat the gamut boundary, and $\Lambda$ is a difference between boundaries $\lambda_{max}$ and $\lambda_{min}$ of the rectangular function or smooth function.

30. The system as claimed in claim 29, wherein the gamut limiting module is configured to compare the at least one calculated gamut ratio (Q) with the threshold value based on comparing $Q_r$ to a first threshold value, and the first threshold value corresponds to $Q_r<1$.

31. The system as claimed in claim 30, wherein the second gamut ratio is represented by an equation $$Q_I(x, y) = \frac{I}{I^{GB}},$$

where I is the intensity, and $I^{GB}$ is the value of I at the gamut boundary.

32. The system of claim 31, wherein the gamut limiting module is further configured to compare the at least one calculated gamut ratio (Q) with the threshold value further based on comparing $Q_I$ to a second threshold value, and the second threshold value corresponds to $Q_I<1$.

33. The system of claim 30, wherein the threshold value is represented by at least one of $$\text{a) } \frac{r}{r^{GB}} = 1, \text{ or b) } \frac{I}{I^{GB}} = 1.$$

34. The system of claim 19, wherein the intensity parameter is the peak amplitude of a spectral function, and the center wavelength parameter is the central wavelength of the peak amplitude of a spectral function.

35. The system of claim 34, wherein the spectral function is a smooth function, the smooth function comprising a linear combination of functions, at least one of the functions comprising at least a cosine square function.

\* \* \* \* \*